United States Patent [19]

Noonan et al.

[11] Patent Number: 5,676,211
[45] Date of Patent: Oct. 14, 1997

[54] ADJUSTABLE TUNNEL SHIELD STRUCTURE

[75] Inventors: James Thomas Noonan, Johnston; Terry Lee Lowe, Ankeny, both of Iowa

[73] Assignee: Deere & Company, Moline, Ill.

[21] Appl. No.: 621,406

[22] Filed: Mar. 25, 1996

[51] Int. Cl.⁶ .................................................. A01B 17/00
[52] U.S. Cl. ...................... 172/512; 172/624.5; 172/646; 172/661
[58] Field of Search .................................. 172/508, 509, 172/510, 511, 512, 513, 624.5, 753, 646, 751, 624, 661, 657

[56] References Cited

U.S. PATENT DOCUMENTS

| | | | |
|---|---|---|---|
| 348,941 | 9/1886 | Witt | 172/509 |
| 432,047 | 7/1890 | Holladay | 172/513 |
| 503,242 | 8/1893 | Kisinger, Jr. | 172/513 |
| 540,214 | 5/1895 | Muse | 172/509 |
| 571,223 | 11/1896 | Foster | 172/509 |
| 640,444 | 1/1900 | Colbert | 172/509 |
| 1,018,298 | 2/1912 | Cheatham | 172/509 |
| 1,106,389 | 8/1914 | Keck . | |
| 1,284,208 | 11/1918 | Anderson et al. | 172/513 |
| 1,289,164 | 12/1918 | Harmsen . | |
| 1,339,586 | 5/1920 | Taylor | 172/509 |
| 1,526,586 | 2/1925 | Becker . | |
| 1,779,334 | 10/1930 | Reeves | 172/509 |
| 2,417,597 | 3/1947 | Hill | 172/512 |
| 2,543,921 | 3/1951 | McCullar | 97/188 |
| 2,804,815 | 9/1957 | Dollen | 172/513 |
| 2,805,614 | 9/1957 | Lipetzky | 172/512 |
| 2,899,776 | 8/1959 | Arnold | 172/624.5 |
| 3,155,169 | 11/1964 | Mattson et al. | 172/512 |
| 3,526,281 | 9/1970 | Meaden et al. | 172/510 |
| 3,804,179 | 4/1974 | Johnson | 172/624.5 X |
| 3,830,311 | 8/1974 | Bryson | 172/624.5 X |
| 3,872,931 | 3/1975 | Camp | 172/753 X |
| 4,282,936 | 8/1981 | Zuhone et al. | 172/512 |
| 4,552,225 | 11/1985 | Behn et al. | 172/513 |
| 4,591,002 | 5/1986 | Meinert | 172/510 |
| 4,715,449 | 12/1987 | Winter et al. | 172/513 |
| 4,905,770 | 3/1990 | Hanig | 172/624.5 |
| 5,544,709 | 8/1996 | Lowe et al. | 172/624.5 X |

*Primary Examiner*—Terry Lee Melius
*Assistant Examiner*—Victor Batson

[57] ABSTRACT

A relatively short tunnel shield is connected to a light weight floating arm including a first tube telescopingly received within a second tube. Multiple holes in the double tube arm allow optimum positioning of the shield relative to a ground engaging element such as a single wide sweep to match different operating speeds without need of a longer and heavier shield. The second tube is pivotally connected to the rig by double plate mounting assembly to minimize side-to-side play. Slots in the double plate mounting assembly provide infinitely adjustable down stop for precision shield height control. The arm can be raised, and by installing a cross pin in the mounting assembly, the shield is maintained in a storage position out of the way of more mature crops.

16 Claims, 2 Drawing Sheets

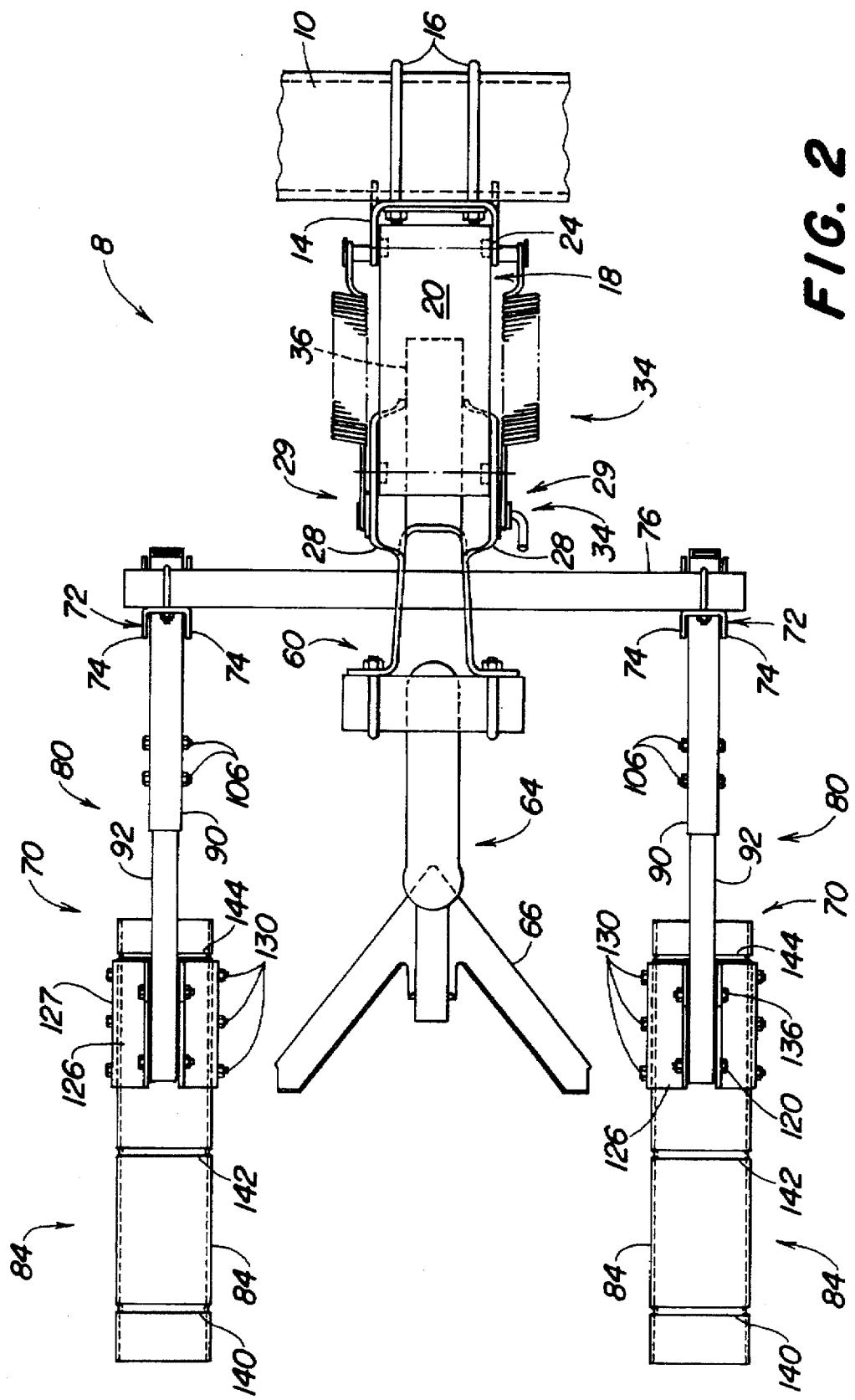

ADJUSTABLE TUNNEL SHIELD STRUCTURE

BACKGROUND OF THE INVENTION

1) Field of the Invention

The present invention relates generally to tillage implements and, more specifically, to shield structure for protecting plants during cultivation.

2) Related Art

Row crop cultivators often include tunnel shields to protect crops against damage caused by soil and residue flow from the ground engaging cultivating implements. Many of the tunnel shields use a four-bar linkage mounting to provide shield float relative to the crop. The linkages typically have many moving parts and can be heavy, sloppy and difficult to adjust for optimum crop protection. Precision height adjustment of the shield relative to the base of the crop is difficult with many of the four-bar structures. In mature crops, the shields often are removed because storage is made difficult by the linkage. Also, most tunnel shield structures are designed to protect a row of crop from flow from four or more ground engaging elements and may not be particularly well suited for use with a single element between rows.

Although various shield systems with a single pivoting arm have been available in the past, most suffer from one or more disadvantages, such as lack of side-to-side stability. Some lack of precision adjustments to accommodate different types of crop and residue conditions and different combinations of earthworking tools and operating speeds.

BRIEF SUMMARY OF THE INVENTION

It is therefore an object of the present invention to provide an improved shield system for a cultivator. It is a further object to provide such an improved shield system which overcomes most or all of the aforementioned problems.

It is a further object of the present invention to provide an improved shield system for a cultivator of relatively light and inexpensive construction. It is a further object to provide such a system which obviates four bar linkage support and yet provides good side-to-side stability with more flexibility and floatability than at least most previously available shield systems.

It is still another object of the present invention to provide an improved shield system which is adaptable for matching a wide range of operating speeds and shovel combinations as well as single wide shovel cultivator operation. It is another object to provide such a system which does not require long, heavy tunnel shields.

It is yet another object of the present invention to provide an improved shield system for a cultivator having more flexibility, better angle adjustability and more accurate placement relative to the crop than most previously available systems. It is another object to provide such a system which has more even floating and better crop protecting characteristics and which has improved wearability.

It is a further object to provide a cultivator rig shield system which is convenient to adjust and wherein shield adjustment structures are generally clustered at one location relative to the cultivator rig, that location also being adjacent other rig adjusting structure such as down pressure and gauge wheel adjustment structure.

It is another object to provide an improved shield system having a shield storage position with ample clearance for developed crops.

A shield system constructed in accordance with the teachings of the present invention includes a tunnel shield of length less than approximately two feet (60 centimeters) connected to a tube telescopingly received within a second tube which is part of a floating arm assembly. Multiple holes in the double tube arm allow optimum positioning of the shield relative to a ground engaging element such as a single wide sweep to match different operating speeds without need of a longer and heavier shield. The second tube is pivotally connected to the rig by double plate mounting assembly to minimize side-to-side play. Slots in the double plate mounting assembly provide infinitely adjustable down stop for precision shield height control so that a proper balance between crop protection and covering of small weeds may be easily achieved. Wear life of the shield is also improved because the precision height control permits the shield to ride above the surface of the ground.

By raising the tube arm and installing a cross pin in the mounting assembly, the shield is maintained in a storage position out of the way of more mature crops. The structure is relatively inexpensive and light in weight and has a minimal number of moving parts to thereby reduce uneven floating of the shields resulting from tolerance stack up. Convenient access is provided to all shield adjustment structure at one general location, that location also providing convenient access to depth control and down pressure adjusting structure. The structure reduces the number of steps necessary for arm angle and length adjustments for proper placement of the shield, both vertically relative to the ground and in the fore-and-aft direction relative to the ground working tool. Adjustments can therefore be made easily to accommodate varying crop, soil, and residue conditions and different tool and operating speed combinations.

These and other objects, features and advantages of the present invention will become apparent to one skilled in the art upon reading the following detailed description in view of the drawings.

BRIEF DESCRIPTION OF THE DRAWINGS

FIG. 2 is a top view of the rig of FIG. 1 with some parts removed to more clearly show the layout.

DETAILED DESCRIPTION OF THE DRAWINGS

Figure 1:
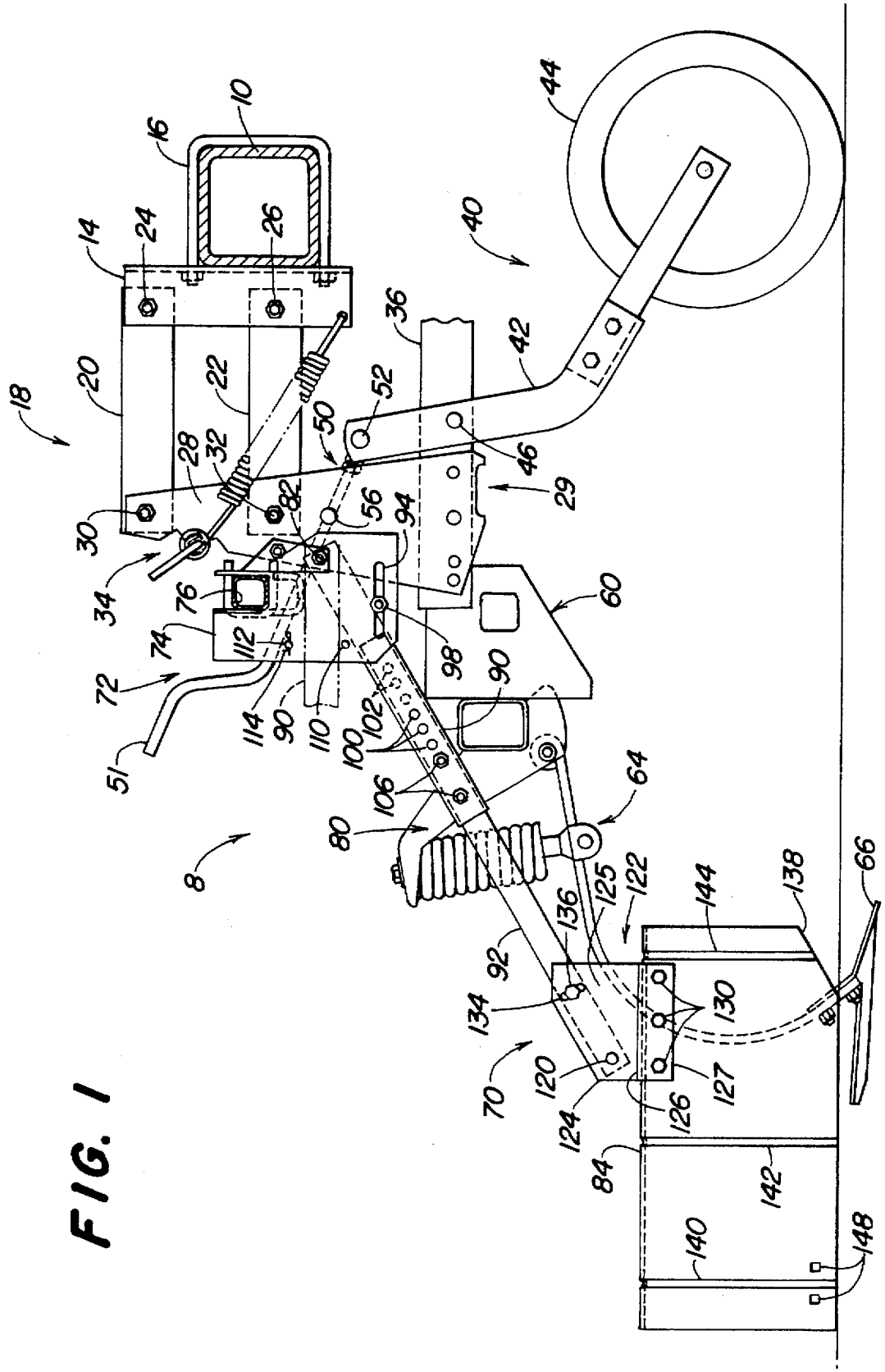
FIG. 1 is a side view of a cultivator rig with the improved shield arrangement.

Referring now to FIGS. 1 and 2, therein is shown a cultivator rig 8 mounted on a toolbar 10 supported from a tractor hitch (not shown) for forward movement through a field with parallel rows of plants. A U-shaped channel bracket 14 is connected to the toolbar 10 by U-bolts 16. A parallel linkage 18 includes upper and lower parallel links 20 and 22 supported between rearwardly directed flanges of the bracket 14 by pivots 24 and 26. The aft ends of the links 20 and 22 are pivotally connected between upright side plates 28 of a tool support 29 by pivots 30 and 32 so the support 29 can rock vertically with respect to the toolbar 10. The parallel linkage 18 maintains the tool support 29 in a preselected attitude relative to the horizontal as the support 29 rocks vertically. An adjustable down pressure spring assembly 34 is connected between bracket 14 and the aft edges of the side plates 28.

A fore-and-aft extending beam 36 is secured to the lower end of the support 29 between the side plates 28. A depth gauging wheel assembly 40 (FIG. 1) includes a wheel arm 42 having a lower end supporting a gauge wheel 44 for rotation below the toolbar 10. The arm 44 straddles the beam 36 and is pivotally connected to the beam at 46. Screw threaded crank structure 50 includes a crank 51 having forward end pivotally connected at location 52 to the upper end of the arm 42 below the lower link 22. The crank structure 50 is pivotally connected to the support 29 at 56 and extends rearwardly between the side plates 28. The gauge wheel 44 is adjusted vertically relative to the beam 36 by rotating the crank structure 50 and pivoting the arm 42 about the location 46.

A tool bracket 60 is connected to the aft end of the beam 36 and supports an earthworking tool assembly 64 having a tool 66 adapted for working the soil between rows of the crop. As shown in FIG. 1, the tool assembly 64 is a spring trip shank assembly and the tool 66 is a single, relatively wide cultivator shovel extending between two adjacent rows of crop. The depth of penetration of the tool 66 when the toolbar 10 is in a lowered field working position is dependent upon the vertical adjustment of the gauge wheel 44. As the tool 66 is moved forwardly through the field, soil and residue is thrown outwardly towards the rows of crop on either side of the tool.

To protect the rows of crop from damage by soil and residue flow and to control the amount of soil that is thrown near the crop to cover small weeds, two adjustable shield structures 70 are carried by the support 29 over adjacent rows on either side of the tool 66. Each shield structure 70 includes a bracket 72 having a pair of transversely spaced side plates 74 supported over a crop row by a transverse support tube 76. The tube 76 is carried at the aft end of the support 29 just rearwardly of the lower link 22 of the parallel linkage 18 (FIG. 1). Adjustable angle and length tube structure 80 has an upper forward end pivotally connected at 82 to the bracket 72 and a lower rearward end pivotally supporting a relatively short tunnel shield 84. The tube structure 80 includes a first tube 90 having a upper forward end sandwiched between the side plates 74 and connected at the location 82 by a transverse pivot. The first tube 90 has a hollow, generally rectangular cross section. A second tube 92 of slightly smaller cross section is telescopingly received within the first tube. The side plates 74 extend a substantial distance rearwardly of the pivot area 82 and, with the closely fitting telescoping tubes, provide good lateral stability for the shield 84.

The side plates 74 each include a slotted portion 94 (FIG. 1) rearwardly and below the pivot location 82. The slot extends in the fore-and-aft direction, and a stop member or bolt 98 is adjustably received by the slot below the tube 90 to act as a down stop for the tube structure 80. As can best be seen in FIG. 1, adjusting the bolt forwardly in the slotted portion 94 permits the tube structure 80 to rock downwardly at a greater angle about the pivot location 82 so the shield 84 moves downwardly. Adjusting the bolt 98 rearwardly in the slotted portion decreases the angle that the tube structure can pivot downwardly thereby raising the operating position of the shield 84.

Fore-and-aft shield adjustability is facilitated by the telescoping tubes 90 and 92 which are apertured respectively at 100 and 102. The tube 92 is telescoped within the tube 90 until the shield 84 is located at the desired position relative to the shovel 66. The position selected is dependent on such factors as tool location and type, operating speed, and soil and residue conditions. Thereafter, bolts 106 are inserted through pairs of the aligned holes 100 and 102 and tightened to firmly secure the tubes together in the adjusted length position. The height of the shield is then adjusted by moving the stop member 98 in the slotted portion 94. It is evident from the above description that infinite down stop positioning along with numerous fore-and-aft shield positioning locations provide a wide range of adjustments which are easily made at adjacent locations on the shield structure. In addition, the rig depth control crank structure 50 and down pressure spring assembly 34 are located adjacent the down stop 98 and telescoping tubes 90 and 92 so that each of the rig adjustments can be made at one general location relative to the rig 8.

Sets of apertures 110 and 112 are located in the side plates 74 of the shield bracket 72. A pin 114 is normally stored in the apertures 112 while the shield is lowered to a field working position. The tube structure 80 is selectively pivotable upwardly by hand to a storage position (broken lines of FIG. 1) wherein the bottom of the tube 90 is located just above the apertures 110. The pin 114 is placed in the apertures 110 below the tube 90 to maintain the tube structure 80 in the storage position. To return the tube structure to the field working position so the shield is at or near ground level, the tube structure 80 is lifted slightly from the storage position and the pin 114 is removed from the apertures 110 so that the tube structure 80 can pivot downwardly towards the stop member 98. The pin 114 is placed in the apertures 112 until needed again to maintain the shield structure in the storage position. The shield 84 is free to pivot between a lowermost position determined by the stop member 98 and the storage position.

The tunnel shield 84, which preferably is less than approximately two feet (60 cm.) long, is pivotally connected at 120 (FIG. 1) to the lower, rearwardmost end of the tube 92 by a bracket 122 which includes a pair of bracket sections 124. Each bracket section 124 includes an upwardly disposed flange 125, a horizontal portion 126 extending outwardly from the flange 125 over a forward top portion of the shield 84, and a downwardly directed flange 127 connected to the side of the shield 84 by bolts 130. The rearward end of the tube 92 is sandwiched between the upwardly directed flanges 125 of the bracket 122 for good side-to-side stability.

The bracket flanges 125 are slotted at 134, and a carriage bolt 136 extending through the slots and an apertures in the tube 92 permits the shield to be fixed to the tube in a generally horizontal attitude. When the position of the down stop 98 is changed or when the length of tube structure 80 is adjusted so that the shield 84 is no longer horizontal, a shield angle adjustment can be made by loosening the carriage bolt 136 and pivoting the shield 84 about the location 120 until the lower edge of the shield is again generally parallel to the surface of the ground. The lower forward edge of the shield 84 is angled at 138 to help the structure ride over residue and other obstructions. The single pivot and light weight construction provide good shield float characteristics.

Ribs 140, 142 and 144 extend around the shield 84 for additional strength and stiffness. Apertures 148 are provided near the rearwardmost rib 140 for attaching a clod deflector or other accessory to the shield 84. Locating the rib 140 at the attaching location increases the strength and stability of the accessory. The forward rib 144 is located closely adjacent the bracket 122 to increase the strength and integrity of the mounting arrangement.

Having described the preferred embodiment, it will become apparent that various modifications can be made without departing from the scope of the invention as defined in the accompanying claims.

We claim:

1. In a cultivator rig having a tool support adapted for forward movement through a field planted with parallel rows of crop and at least one earthworking tool connected to the tool support for working the soil between rows, shield structure for protecting the crop from dirt and trash thrown outwardly from the earthworking tool, the shield structure comprising:

transversely spaced side plates connected to the tool support;

a first tube having first and second ends and a hollow, generally rectangular cross section, the first end sandwiched between the spaced side plates and pivotally connected relative to the side plates for rocking of the second end vertically with respect to the side plates, the second end trailing and extending downwardly from the side plates;

a second tube having a mating end telescopingly received by the second end of the first tube, and a shield receiving end extending downwardly and rearwardly from the first tube, the second tube adjustable longitudinally relative to the first tube for selectively varying the distance between the shield receiving end and the first end of the first tube;

a tunnel shield elongated in the fore-and-aft direction and having an upper bracket connected to the shield receiving end;

tube angle adjusting structure connected to the side plates and including an adjustable stop member, the stop member contacting the first tube and limiting the downward rocking of the first tube to an adjustable lowermost position, the telescoping first and second tubes and the angle adjustment structure providing infinite adjustment of down stop positioning within a preselected range of positions and multiple fore-and-aft shield positioning locations; and including a tube pivotal axis, and a stop receiving structure in the side plates above the pivotal axis for retaining the tubes in a raised position with the tunnel shield out of the way of crop.

2. The invention as set forth in claim 1 wherein the tube angle adjusting structure comprises a slotted section of the side plates and the stop member is movable along the slotted section below the first tube.

3. The invention as set forth in claim 1 wherein the earthworking tool comprises a single wide cultivator sweep extending substantially the entire distance between adjacent rows of the crop.

4. The invention as set forth in claim 1 wherein the cultivator rig includes a depth control adjustment, and wherein the tube angle adjusting structure is located adjacent the depth control adjustment.

5. The invention as set forth in claim 4 wherein the rig also includes a down pressure adjustment located adjacent the depth control adjustment and the tube angle adjusting structure so that adjustments can be made from one general location relative to the rig.

6. In a cultivator rig having a tool support adapted for forward movement through a field planted with parallel rows of crop and at least one earthworking tool connected to the tool support for working the soil between rows, shield structure for protecting the crop from dirt and trash thrown outwardly from the earthworking tool, the shield structure comprising:

transversely spaced side plates connected to the tool support;

a first tube having first and second ends and a hollow, generally rectangular cross section, the first end sandwiched between the spaced side plates and pivotally connected relative to the side plates for rocking of the second end vertically with respect to the side plates, the second end trailing and extending downwardly from the side plates;

a second tube having a mating end telescopingly received by the second end of the first tube, and a shield receiving end extending downwardly and rearwardly from the first tube, the second tube adjustable longitudinally relative to the first tube for selectively varying the distance between the shield receiving end and the first end of the first tube;

a tunnel shield elongated in the fore-and-aft direction and having an upper bracket connected to the shield receiving end;

tube angle adjusting structure connected to the side plates and including an adjustable stop member, the stop member contacting the first tube and limiting the downward rocking of the first tube to an adjustable lowermost position, the telescoping first and second tubes and the angle adjustment structure providing infinite adjustment of down stop positioning within a preselected range of positions and multiple fore-and-aft shield positioning locations; and wherein the shield comprises a tunnel shield with top and side walls, and bracket structure connecting the tunnel shield to the shield receiving end, the bracket including an upwardly directed portion embracing the shield receiving end, a horizontal portion extending outwardly toward the side walls, and a down-turned portion fixed to the shield side walls.

7. The invention as set forth in claim 6 wherein the tunnel shield includes a reinforcing rib located adjacent the bracket structure.

8. The invention as set forth in claim 7 wherein the reinforcing rib extends vertically along the shield side walls and horizontally along the top wall.

9. In a cultivator rig having a parallel bar linkage with upper and lower fore-and-aft extending links, a tool support pivotally connected to the aft ends of the links and extending downwardly from the lower link, an earthworking tool supported from the tool support, a gauge wheel assembly including a depth adjusting member projecting from the tool support below the lower link and providing adjustable depth control for the tool, a shield support extending transversely from the tool support rearwardly of the linkage, a pair of shield assemblies connected to opposite ends of the shield support, each shield assembly including:

transversely spaced side plates connected to the shield support;

a first tube having first and second ends, the second end being hollow and generally rectangular cross section, the first end sandwiched between and pivotally connected to the spaced side plates, the second end trailing and extending downwardly from the side plates;

a second tube having a mating end telescopingly received by the second end of the first tube, and a shield receiving end extending downwardly and rearwardly from the first tube, the second tube adjustable longitudinally relative to the first tube for selectively varying the distance between the shield receiving end and the first end of the first tube;

a tunnel shield elongated in the fore-and-aft direction and having an upper bracket connected to the shield receiving end;

tube angle adjusting structure connected to the side plates and including an adjustable stop member, the stop member contacting the first tube and limiting the downward rocking of the first tube to an adjustable lowermost position, the telescoping first and second tubes and the angle adjustment structure thereby providing infinite down stop adjustment within a range of positions and multiple fore-and-aft shield positioning locations;

wherein the spaced side plates sandwich the first tube at a location rearwardly and below the pivotal connection of the first tube with the side plates to thereby provide lateral stability to the first and second tubes;

wherein the tunnel shield upper bracket includes means for securing the shield to the second tube at one of a plurality of selectable angles so that the shield is substantially horizontal; and wherein the upper bracket includes a pair of upwardly directed flanges sandwiching the shield receiving end of the second tube, outwardly diverging horizontal portions connected to lower ends of the upwardly directed flanges, and down turned flanges fixed to sides of the shield.

10. The invention as set forth in claim 9 wherein the tube angle adjusting structure is substantially supported by the side plates and is located adjacent the gauge wheel depth adjusting member.

11. The invention as set forth in claim 10 further including means for releasibly securing the first and second tubes rigidly together in preselected locations, the means for releasibly securing located adjacent the tube angle adjusting structure.

12. The invention as set forth in claim 9 further comprising slot structure in the upper bracket for facilitating angle adjustment of the shield to compensate for changes in tube angle adjustment and retain the shield in generally a horizontal attitude.

13. The invention as set forth in claim 9 including a reinforcing rib located in the shield adjacent the upper bracket.

14. The invention as set forth in claim 9 wherein the rig includes down pressure adjusting structure, a gauge wheel, and gauge wheel adjusting structure, and wherein the down pressure adjusting structure and the gauge wheel adjusting structure are located adjacent the tube angle adjusting structure so that rig adjustments can be made generally from one location relative to the rig.

15. The invention as set forth in claim 14 including tube securing structure for adjustably securing the first and second tubes together, and wherein the tube securing structure is located adjacent the tube angle adjusting structure.

16. The invention as set forth in claim 14 further comprising means for adjusting the angle of the shield relative to the second tube, the means for adjusting the angle located adjacent the tube securing structure.

* * * * *